No. 828,487. PATENTED AUG. 14, 1906.
A. M. KONKLE & J. C. ANDERSON.
NUT LOCK.
APPLICATION FILED OCT. 21, 1905.

Witnesses

Inventors
A. M. Konkle and
J. C. Anderson
By
Attorneys

UNITED STATES PATENT OFFICE.

ALFRED M. KONKLE AND JOSEPH C. ANDERSON, OF CORDOVA, ALABAMA.

NUT-LOCK.

No. 828,487.

Specification of Letters Patent.

Patented Aug. 14, 1906.

Application filed October 21, 1905. Serial No. 283,821.

*To all whom it may concern:*

Be it known that we, ALFRED M. KONKLE and JOSEPH C. ANDERSON, citizens of the United States, residing at Cordova, in the county of Walker and State of Alabama, have invented certain new and useful Improvements in Nut-Locks, of which the following is a specification.

The object of this invention is to provide a simple means for locking nuts to bolts; and the invention is adapted for application to rail-joints, machinery, bridgework, or in any place where it is desirable to prevent accidental displacement of a nut from a bolt.
In its preferred embodiment the invention consists of a plate having locking-tongues cut therefrom, said tongues being adapted to cooperate with a nut or a plurality of nuts in order to prevent unscrewing thereof.
For a full descripiton of the invention and the merits thereof and also to acquire a knowledge of the details of construction of the means for effecting the result reference is to be had to the following description and accompanying drawings, in which—

Figure 1:
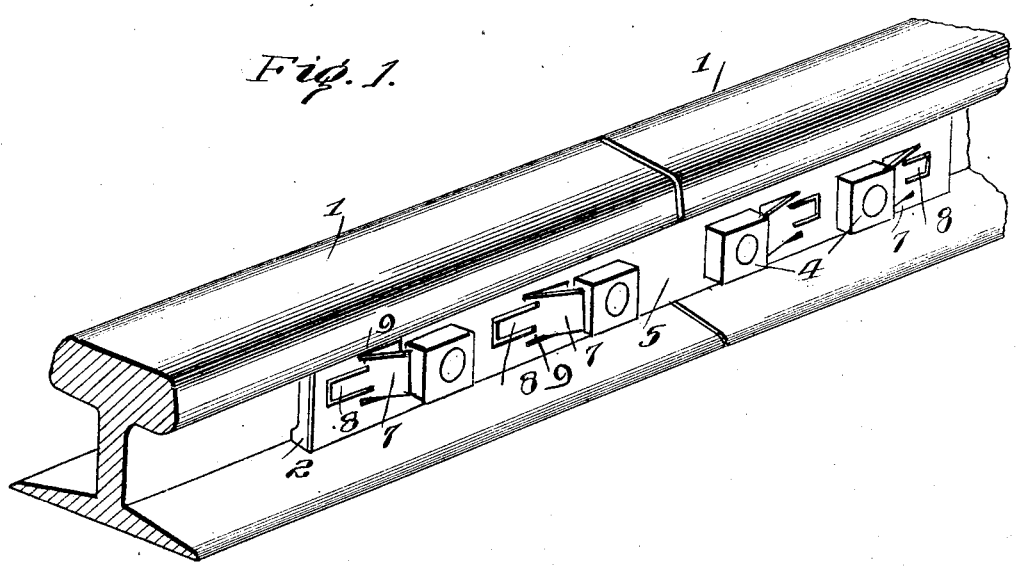
Figure 2:
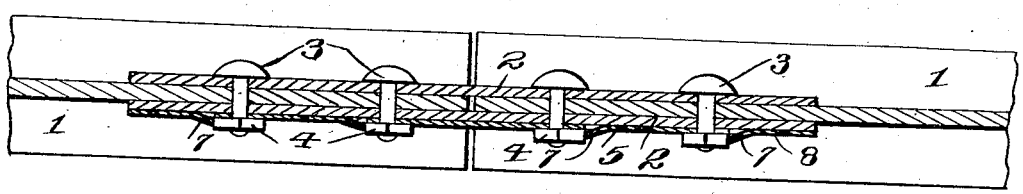
Figure 3:
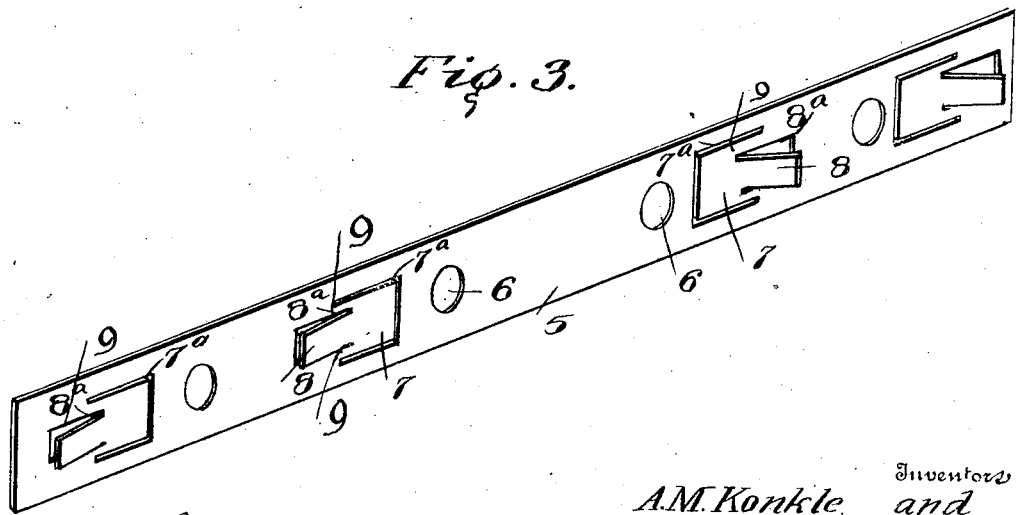

Figure 1 is a perspective view of a nut-lock embodying the invention. Fig. 2 is a horizontal sectional view showing the nut-lock when applied, the locking-tongues of the locking-plate being in operative position with relation to the nuts to prevent unscrewing of the latter. Fig. 3 is a detail perspective view of the locking-plate alone, the locking-tongues being shown in the positions in which they are arranged before application of the invention.

Corresponding and like parts are referred to in the following description and indicated in all the views of the drawings by the same reference characters.

The invention is shown applied to a rail-joint, and the rails are designated at 1, the angle-bars at 2, and the bolts at 3. The nuts are denoted 4, and the general assemblance of the foregoing parts is substantially the same as commonly in use. The locking-plate is indicated at 5, and said plate may be constructed with one or more bolt-openings 6. For each bolt-opening provided in the locking-plate 5 the plate is formed with a pair of tongues, (indicated at 7 and 8.) The tongue 7 of each pair is a locking-tongue and is adapted to engage directly with an adjacent nut on the bolt passing through the adjacent opening 6 to prevent unscrewing thereof. The tongue 8 of each pair before mentioned is an actuating-tongue mainly, being adapted to throw the tongue 7 outwardly from the plane of the plate 5, so that the same will have a locking coaction with the adjacent nut in a manner above described. Each pair of tongues 7 and 8 is formed by the provision of adjacent U-shaped slits or cuts, (indicated at 7$^a$ and 8$^a$, respectively,) and these are formed in the operation by which the locking-plate 5 is itself made. The sides of the slit or cut 7$^a$ of each pair of tongues overlap those of the slit or cut 8$^a$ adjacent, and this arrangement is such that the two tongues 7 and 8 are connected with the body of the plate 5 by means of narrow webs 9 only, such connection being advantageous, as will appear hereinafter.

In the actual manufacture of the device the plate 5 may be stamped from a body of sheet metal, and in the stamping operation the openings 6, with the slits 7$^a$ and 8$^a$, are likewise formed. Further, in the operation of stamping the device from the sheet metal the tongue 8 of each pair of tongues 7 and 8 will be pressed outward from the outside of the plate 5 slightly, while the tongue 7 of each pair will remain substantially in the same plane as that including the body of the plate 5.
In the use of the invention the parts to be connected—namely, the rails 1 in the illustration—are placed in position with the angle-bars 2 adjacent, and the bolts 3 are passed through the parts in the customary way.
The locking-plate 5 is so disposed that the bolts 3 pass therethrough, and then the nuts 4 are screwed on the bolts hard against the plate 5. The straight side of the nuts is arranged in alinement with the straight outer edge of the locking-tongues 7, and a hammer or similar tool is used to strike the actuating-tongues 8 to force the same toward the plane, including the plate 5. The above will cause the locking-tongues 7 to be projected outwardly to an extent sufficient to cause the outer edges thereof to engage the sides of the nuts and firmly lock the latter from movement. To release the nuts, the locking-tongues will be struck, as described hereinbefore with reference to the actuating-tongues, and the latter will be projected out, while the tongues 7 will be forced into the plane of the plate 5 and permit ready unscrewing of the nuts.
Having thus described the invention, what is claimed as new is—

1. In a nut-lock, the combination of bolts nuts adapted to be screwed on the bolts, and a lock-plate, said lock-plate embodying complemental locking and actuating tongues, the locking-tongues being adapted to engage sides of the nuts to prevent the same from being accidentally displaced, each locking-tongue being normally in the plane of the locking-plate, while the adjacent actuating-tongue therefor projects from the plane of the locking-plate so as to be actuated in order to cause its locking-tongue to engage the side of the adjacent nut.

2. As an article of manufacture, a nut-lock comprising a locking-plate having a bolt-opening therein, said locking-plate being formed with a pair of tongues adjacent said bolt-opening, said tongues being integral with the plate and with each other, one of the tongues being a locking-tongue adapted to engage a nut on the bolt passed through the opening in the locking-plate, the other of the tongues being an actuating-tongue normally projecting outwardly from the plane of the locking-plate and adapted to be struck so as to be forced toward the plane of the locking-plate and thereby project the locking-tongue from the plane of said lock-plate.

3. As an article of manufacture, a nut-lock comprising a lock-plate having a bolt-opening therein, said plate being formed with U-shaped slits adjacent the bolt-opening to thereby provide complemental locking-tongues, the sides of the slits overlapping, whereby the locking-tongues are joined to the body of the plate by short webs, one of said tongues being normally projected from the plane of the locking-plate to admit of being struck to project the other tongue from the plane of said plate.

In testimony whereof we affix our signatures in presence of two witnesses.

ALFRED M. KONKLE. [L. S.]
JOSEPH C. ANDERSON. [L. S.]

Witnesses:
J. H. CRAIG,
W. H. NATION.